United States Patent [19]

Behn et al.

[11] Patent Number: 4,508,049

[45] Date of Patent: Apr. 2, 1985

[54] METHOD AND A DEVICE FOR THE PRODUCTION OF ELECTRICAL COMPONENTS, IN PARTICULAR LAMINATED CAPACITORS

[75] Inventors: Reinhard Behn; Hermann Heywang, both of Munich; Horst Pachonik, Unterhaching, all of Fed. Rep. of Germany

[73] Assignee: Siemens Aktiengesellschaft, Berlin and Munich, Fed. Rep. of Germany

[21] Appl. No.: 87,413

[22] Filed: Oct. 22, 1979

[30] Foreign Application Priority Data

Nov. 2, 1978 [DE] Fed. Rep. of Germany ....... 2847602

[51] Int. Cl.³ .............................................. B05D 3/06
[52] U.S. Cl. .................................. 118/50.1; 118/719; 118/720; 118/723; 118/730; 427/41; 427/42; 427/250; 427/255.7
[58] Field of Search ................. 427/41, 81, 255.7, 250, 427/38, 42; 204/164, 165; 118/50.1, 719, 721, 723, 730

[56] References Cited

U.S. PATENT DOCUMENTS

| | | | |
|---|---|---|---|
| 1,784,611 | 12/1930 | Polanyi et al. | 427/81 |
| 2,799,600 | 7/1957 | Scott | 118/719 |
| 2,925,062 | 2/1960 | Schwindt | 118/719 |
| 3,068,510 | 12/1962 | Coleman | 427/41 |
| 3,205,855 | 9/1965 | Ault | 118/721 |
| 3,925,187 | 12/1975 | Bernard | 427/38 |
| 4,058,430 | 11/1977 | Suntola et al. | 427/255.7 |
| 4,184,448 | 1/1980 | Aichert et al. | 427/42 |

FOREIGN PATENT DOCUMENTS

| | | | |
|---|---|---|---|
| 857885 | 1/1961 | United Kingdom | 427/81 |
| 970865 | 9/1964 | United Kingdom | |
| 618452 | 10/1974 | U.S.S.R. | 118/730 |

*Primary Examiner*—John H. Newsome
*Attorney, Agent, or Firm*—Hill, Van Santen, Steadman & Simpson

[57] ABSTRACT

Electrical components which have alternate metal and polymer layers carried on a substrate are produced by fixing the substrates on a rotatable drum and rotating the drum through first and second vacuum chambers which are air-locked with respect to each other. A metal layer is applied in the first vacuum chamber by vapor deposition or sputtering and a polymer layer is provided in the second chamber by a glow discharge operation.

6 Claims, 3 Drawing Figures

METHOD AND A DEVICE FOR THE PRODUCTION OF ELECTRICAL COMPONENTS, IN PARTICULAR LAMINATED CAPACITORS

BACKGROUND OF THE INVENTION

1. Field of the Invention

The present invention relates to a method and to a device for the production of electrical components, and in particular laminated capacitors, in which metal coatings and coatings of polymer applied by glow-discharge are applied one on top of another, in alternation, on a carrier, and in which the metal coatings are produced in a vacuum with a different residual pressure to that for the polymer coatings which are applied by the glow discharge process.

2. Description of the Prior Art

A composition of the type generally set forth above is known in the art. For example, British Pat. No. 970,865 describes a capacitor in which a plurality of metal coatings and dielectric coatings of metal oxide are disposed one on top of another. The oxide coatings are produced by oxidizing the metal coatings. This method can only be used with relatively thick metal coatings. In the process, the metal coatings are chemically changed by the oxidation and partially broken down. Therefore, reproducible coating thicknesses are not immediately obtainable. Consequently, capacitors of high quality and high dielectric field strength cannot be produced by this known method.

SUMMARY OF THE INVENTION

The object of the present invention is to produce laminated capacitors with a plurality of coating surfaces lying one upon another and coatings of insulated material lying between these coatings on a series scale with the attendant object of attaining high values for dielectric field strength and low values for the loss factor.

The above object is achieved in that, in a method of the type generally mentioned above, start carriers are fixed on a drum, the drum is so disposed in a vacuum vessel that the carriers are passed through a first vacuum chamber, air locks and a second vacuum chamber by one rotation of the drum about its axis, and that the carriers are coated with metal in the first vacuum chamber and with a glow discharge polymer in the second vacuum chamber. The carriers can be passed through the two vacuum chambers a number of times according to the desired number of coatings. A plurality of chambers, separated from one another by air locks in each case, can also be used in the same vacuum vessel. In this case, for example, a chamber for producing a metal coating will always follow the chamber for producing a glow discharge polymer coating.

The proposed method has the advantage that the carrier does not come into contact with air between the application of the metal coating and the application of the glow discharge polymer coating. This avoids deposits of dust and oxidation of the metal surfaces. Both dust and oxidation of the metal surfaces impair contact and coating quality so much that a large number of successive coatings very rapidly lead to a high reject rate with series production of capacitors. Advantageously, the carriers are firmly clamped in recesses in the cylindrical casing of the drum. This protects the carriers.

If the metal coatings are to be produced particularly quickly, the metal is expediently applied by vapor deposition in a vacuum. Particularly uniform and thin coatings can be produced by vapor deposition of the metal by means of an electron beam. Especially secure coatings are produced by sputtering, when a magnet current is used to produce the stream of metal. Such a method is known per se and described, for example, by S. Schiller, U. Heisig and K. Goedicke, in the annual publication of "Vakuumtechnik", No. 3, p. 75.

An advantageous device to implement the proposed method is one which comprises a vacuum vessel with two vacuum chambers in which air locks are disposed between the vacuum chambers and which comprises a drum on whose cylindrical casing the air locks are located, and which contains metalizing equipment in a first chamber, this device exhibiting the further features that in the area of its cylindrical casing the drum exhibits recesses and retaining devices for the carriers in these recesses. Between any two neighboring recesses, a strip of the cylindrical casing of the drum is left as a sealing strip and air lock end pieces are provided in the form of segments of a cylinder coaxial with the drum. The end pieces extend to the drum and only leave a small gap at the drum. The length of the end pieces are greater than the gap between two strips of the cylindrical casing. Here, the length of the end piece is to be understood as the extension of the end pieces in the direction of rotation of the drum.

From the German allowed application No. 10 09 883, a device for vapor deposition of plastic strips is known which comprises a vacuum vessel with two chambers having air locks disposed between the vacuum chambers, and which comprises a drum mounted so that it can be rotated, and on whose cylindrical casing the air locks are located, and which contains equipment for metalizing in a first vacuum chamber. There, the drum merely serves to guide the film for metalization in the area of the locks. Metalization takes place some distance from the drum. There, the film for vapor deposition is guided to the metalizing zone by means of separate guide rolls. Also, the second chamber houses two spools of which one unwinds and the other winds up the film. Such a device is relatively costly and unsuitable for alternating application of metal and plastic coatings. In addition, it can only metalize films whose length is considerably greater than the dimensions of the device, in particular the circumference of the drum. In contrast, a device constructed in accordance with the present invention can also feed small and minute carriers for coating. Any number of coatings can be disposed on top of one another without the carrier coming into contact with air during the process.

A high disruptive field strength through the dielectric and a low loss factor are attained in that the device houses a glow discharge polymerization section in its second chamber. The production of high quality dielectrics by glow discharge polymerization is known from the German Pat. No. 21 05 003. Glow discharge polymer coatings can also be applied in large numbers in alternation with metal coatings. They exhibit little thermal sensitivity. The metal coatings can therefore be applied on the glow discharge polymer coatings at a high deposition speed. Advantageously, aluminum is vapor deposited as the metal coatings.

Advantageously, the glow discharge polymerization section is formed by the cylindrical casing of the drum and a counter electrode in the form of a cylindrical surface disposed concentric with this casing, the drum and the counter electrode being connected to the respective poles of an a.c. voltage source. Even concentration of the monomers to be polymerized is achieved in that apertures spread-over the cylindrical surface of the counter electrode are formed in this cylindrical surface and communicate with a delivery line for the gas to be polymerized. Therefore, monomer gas is fed evenly to all the areas of the glow discharge zone and produces uniform coatings. Advantageously, masks are provided to cover the parts of the carriers not requiring coating. Also advantageously, the device has one mask for each recess, which mask is automatically moved according to the position required in the vacuum chamber which is about to be traversed, three masks positions being provided for this purpose. So, when making a number of passes through the vacuum chambers, very accurately aligned coatings lying exactly on top of one another can be produced, groups of coatings being offset relative to one another.

Undesired coating of the drum is avoided in that the counter electrode in the glow discharge polymerization zone is narrower than the axial extension of the masks. Consequently, the glow discharge does not cover the entire mask area; the parts of the drum next to the masks in the axial direction are minimally coated. To preclude even slight coating of these zones, it is recommended that grooves be machined into the cylindrical casing of the drum in the axial direction in front of and behind the masks, these grooves being at least as long as the mask extension in the circumferential direction. This practically eliminates coating of the edge zones of the drum as no potential drop of the necessary magnitude can develop in this area and since no appreciable deposition now takes place on the parts of the drum located further from the glow discharge polymerization zone as a result. In addition, a very slight deposit can no longer have any detrimental effects, as it can no longer arise on the parts of the drum required for sealing at the air locks. For easy liberation of the parts of the drum exposed to the glow discharge, namely the strips between any two neighboring recesses, from the coatings being deposited thereon, these strips are advantageously covered with detachable plates.

For rational production, the glow discharge polymerization zone extends over roughly ⅔ of the circumference of the drum. Advantageously, the air locks have two or more end pieces between which are connections for evacuation pumps.

The chamber with the lower residual gas pressure is, for example, the chamber fitted with a vapor deposition system for deposition of metal, whereas the polymerization chamber requires a higher residual gas pressure.

A preferred embodiment of the invention is an apparatus wherein each of said air-locks comprises at least two end pieces neighboring to the periphery of the drum, sections of the drum between said recesses being parts of said air-locks, wherein the extension of said end pieces in the circumferential direction of the drum is larger than the sum of the extension of one recess and one section in the circumferential direction of the drum, wherein only a narrow gap remains between said end pieces and said sections along the entire length of the sections. Advantageously the counter electrode is narrower than the axial extension of the masks. Advantageously between said two end pieces a port is arranged for the evacuation of residual monomer gas and/or vaporized metal respectively diffusing through said narrow gap.

BRIEF DESCRIPTION OF THE DRAWINGS

Other objects, features and advantages of the invention, its organization, construction and operation will best be understood from the following detailed description, taken in conjunction with the accompanying drawings, on which.

DESCRIPTION OF THE PREFERRED EMBODIMENTS

Figure 1:
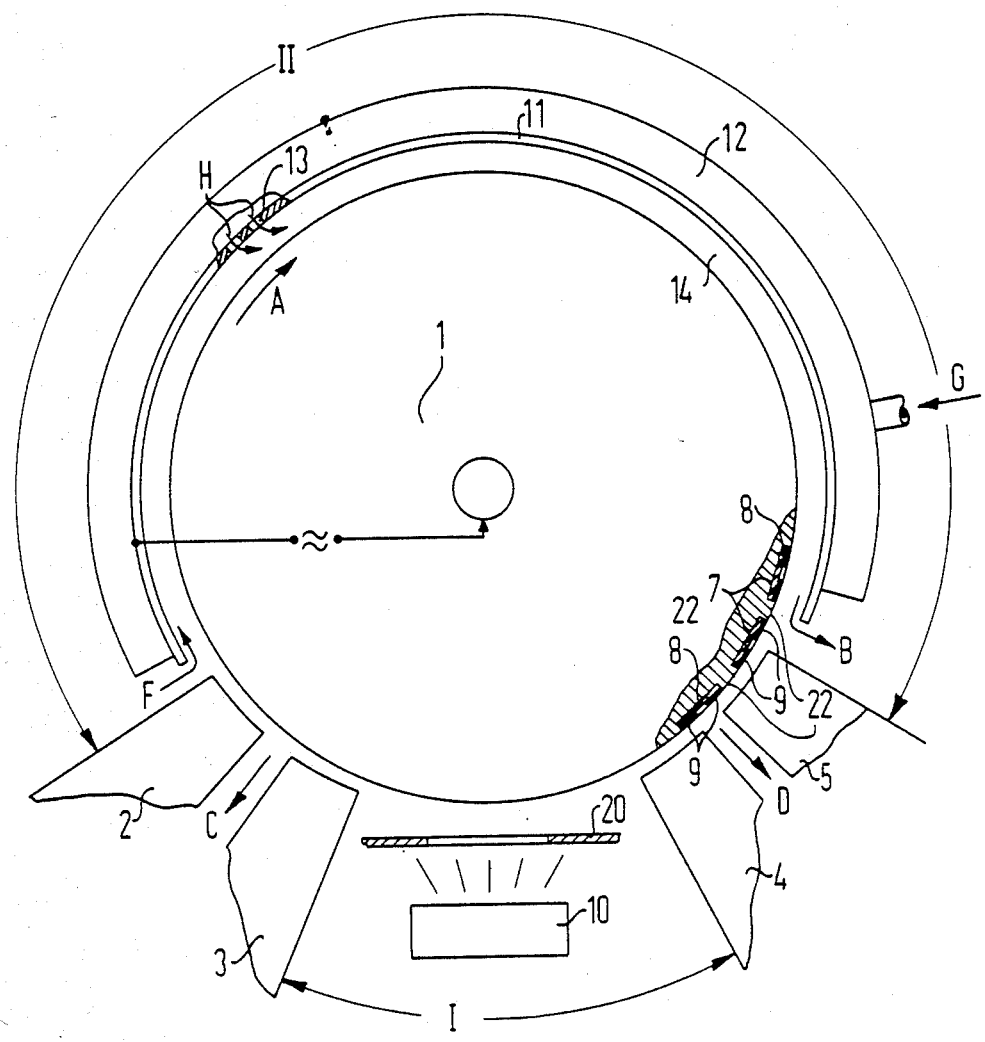
FIG. 1 is a schematic representation of apparatus for practicing the invention, shown partially in section.

Referring to FIG. 1, a drum 1 is rotatably mounted in a vacuum vessel having vacuum chambers I and II and revolves in the direction of the arrow A. The vacuum chambers I and II are separated from one another by air locks which are formed by the end pieces 2-5. Residual gas is evacuated in the directions of the arrows C and D between the end pieces 2 and 3, and 4 and 5, respectively. In the direction of rotation A of the drum 1 in front of and behind the vacuum chamber I having the lower residual gas pressure there is in each case an air lock formed by the end pieces 2, 3 and 4, 5.

Carriers 8 are firmly clamped in respective recesses 7. The parts of the carriers 8 not requiring coating are covered with masks 9. A metal coating is vapor deposited on the carriers 8 in the metal deposition zone by means of a metal vaporizer 10 located in the vacuum chamber I. Then, a glow discharge polymer coating is applied in the vacuum chamber II, there being an alternating electrical field applied between the drum 1 and a counter electrode 11. The gas to be polymerized is blown into the glow discharge polymerization chamber 14 in the direction of the arrow F at the gas inlet and simultaneously in the direction of the arrow G through the gas feed line 12 and apertures 13 in the counter electrode 11. The waste gas is evacuated in the direction of the arrow B at a gas outlet.

Figure 2:
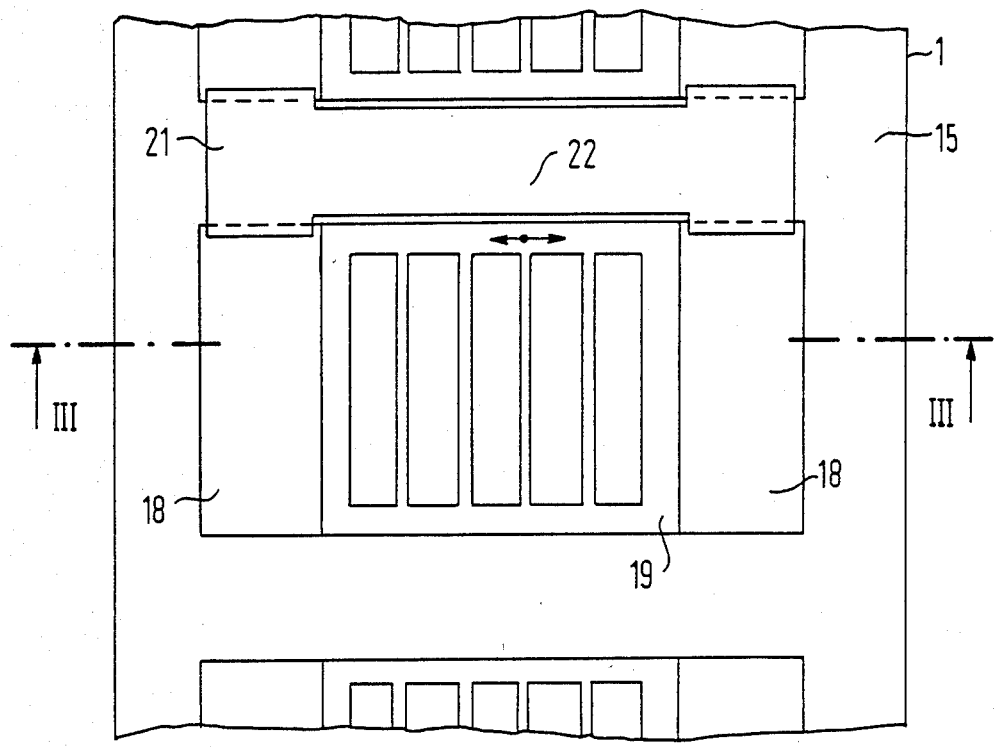
FIG. 2 is a plan view of one of the described recesses in the circumference of a drum having a mask system.
Figure 3:
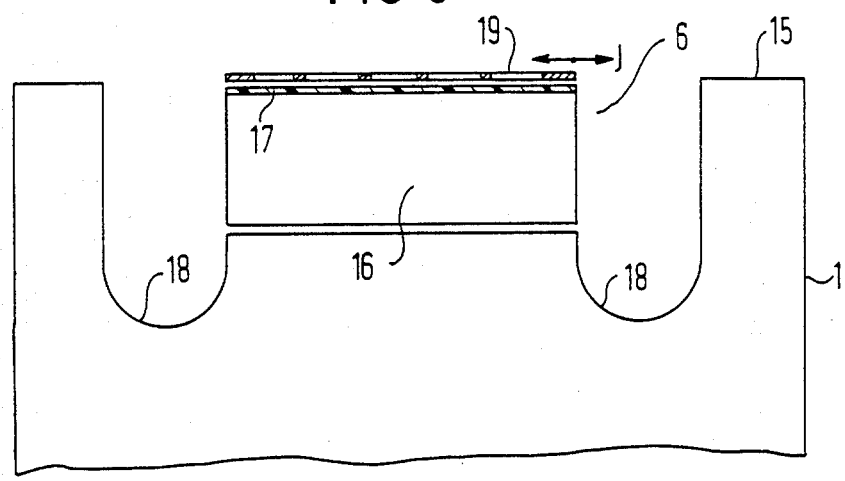
FIG. 3 is a sectional view taken through a recess along the parting line III—III of FIG. 2.

Recesses 6 in the cylindrical casing 15 of the drum 1 receive retaining plates 16 for the carriers 17 (FIGS. 2 and 3). In the axial direction next to the retaining plates 16 grooves 18 are provided forming recesses extending under the retaining plates 16. The parts of the carriers 17 not to be coated are covered by masks 19. This corresponds to the structure 8 and 9 of FIG. 1. The masks 19 can be moved to either side in the direction of the double headed arrow J. The movement of the masks 19 always takes place while passing through the locks before entering the next vacuum chamber I, II. Three precisely defined masks positions are fixed for this purpose. Movement takes place automatically in accordance with a program for the coatings to be deposited. For example, the glow discharge polymerization coating is always applied in a central position, whereas the metal coatings are in each case applied offset to the left during one revolution of the drum and offset to the right during the next revolution of the drum.

In order to achieve uniform thickness of the metallic coating, a mask 20 is disposed above the vaporizer 10, its size and shape compensating for varying rates of deposition of the vaporizer 10 that depend on its geometry. The shape of the mask 20 can also bring about a desired profile in the coating thickness.

Advantageously, the masks 19 which cover the parts of the substrates not requiring coating are moved and controlled by means of mechanical, magnetic or electromagnetic devices.

The grooves 18 are of a length which at least equals the extension of a mask 19 in the direction of rotation of the drum 1. They guarantee exact limitations of the electrical field in the area of the edges of the mask, the glow discharge polymer coatings remain confined to the area of the mask, and the outer coatings of the cylindrical casing 15 can be used for lateral sealing.

To ensure a seal that cannot be unacceptably contaminated between the recesses in the direction of rotation of the drum, as well as when passing through the locks, thin plates 21 are provided, which plates can be removed from time to time and replaced or cleaned to remove the coatings built up thereon, and are positioned, for example, clamped, on the sections 22.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Apparatus for producing electrical components which have at least one metal coating and at least one polymer coating carried one on top of another on a carrier, comprising:

a rotatable drum including a peripheral surface and a plurality of recesses in said surface;

retaining means for retaining a plurality of carriers in said recesses;

said drum adapted for connection to one pole of an a.c. voltage source;

a counter electrode spaced from and extending about a first portion of said drum defining a polymerization chamber, said counterelectrode adapted for connection to another pole of the a.c. voltage source and including first supply means communicating with the space between said counterelectrode and said drum for attachment to a monomer gas supply, said polymerization chamber operable to apply a polymer coating on the electrical component structure traveling therethrough;

first and second air-locks at respective circumferential ends of said counterelectrode, each of said air-locks including a port communicating with said polymerization chamber for the evacuation of residual monomer gas;

a metallization chamber extending circumferentially about a portion of said drum between said first and second air-locks; and metallization means in said metallization chamber for applying a metal coating to the electrical component structure traveling therethrough.

2. The apparatus of claim 1, wherein:
   said metallization means comprises means producing an electron beam to vaporize metal.

3. The apparatus of claim 1, wherein:
   said metallization means comprises sputtering means including a magnetron for generating a sputtering field.

4. The apparatus of claim 1, wherein:
   said metallization means comprises vapor deposition means.

5. Apparatus for producing electrical components which have at least one metal coating and at least one polymer coating arranged alternately on top of one another on a substrate, comprising:

a rotatable drum including at least one recess in the surface thereof, means for retaining a carrier in said recess;

chamber means defining first and second vacuum chambers along the periphery of said drum, including air-lock means forming air-locks between said first and second vacuum chambers;

each of said air-lock means comprising at least two end pieces neighboring to the periphery of the drum sections of the drum between said recesses, wherein the length of said end pieces in the circumferential direction of the drum is larger than the sum of the length of one recess and one section in the circumferential direction of the drum, wherein only a narrow gap remains between said end pieces and said sections along the entire length of the sections;

metallization means in said first vacuum chamber operable to apply a metal coating to the electrical component structure traveling therethrough; and polymerization means communicating with said second vacuum chamber and operable to apply a polymer coating to the electrical component structure traveling therethrough.

6. The apparatus of claim 5, wherein between said two end pieces a port is arranged for evacuation of residual monomer gas and/or vaporized metal respectively diffusing through the narrow gaps.

* * * * *